United States Patent
Sato

(10) Patent No.: US 12,519,925 B2
(45) Date of Patent: Jan. 6, 2026

(54) METHOD OF VISUALIZING CALIBRATION STATE OF CAMERA, SYSTEM, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventor: Shun Sato, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 316 days.

(21) Appl. No.: 18/322,695

(22) Filed: May 24, 2023

(65) Prior Publication Data

US 2023/0388482 A1    Nov. 30, 2023

(30) Foreign Application Priority Data

May 25, 2022   (JP) ................. 2022-084959

(51) Int. Cl.
*H04N 17/00* (2006.01)
*G06T 7/80* (2017.01)
*G06T 11/60* (2006.01)

(52) U.S. Cl.
CPC ............ *H04N 17/002* (2013.01); *G06T 7/80* (2017.01); *G06T 11/60* (2013.01); *G06T 2207/10028* (2013.01); *G06T 2207/30204* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 5,978,521 A * | 11/1999 | Wallack | ............... | G01B 11/275 382/294 |
| 6,205,240 B1 * | 3/2001 | Pietrzak | ................. | G01B 11/02 250/559.22 |
| 6,490,369 B1 * | 12/2002 | Beiman | ..................... | G06T 7/74 382/151 |
| 6,668,082 B1 * | 12/2003 | Davison | .................... | G06T 7/55 348/42 |
| 6,681,151 B1 * | 1/2004 | Weinzimmer | ......... | B25J 9/1697 356/243.1 |
| 7,372,051 B2 * | 5/2008 | Tsuneta | .................. | G01N 23/22 250/397 |
| 9,800,867 B2 * | 10/2017 | Itoh | ...................... | H04N 13/239 |
| 10,399,227 B1 * | 9/2019 | Islam | ..................... | B25J 9/1697 |
| 10,652,521 B2 * | 5/2020 | Itoh | ...................... | H04N 23/695 |
| 11,093,804 B1 * | 8/2021 | Suezawa | ................ | G06V 20/20 |

(Continued)

FOREIGN PATENT DOCUMENTS

JP    2021-024056 A    2/2021

*Primary Examiner* — Sath V Perungavoor
(74) *Attorney, Agent, or Firm* — Harness, Dickey & Pierce, P.L.C.

(57) ABSTRACT

A method according to the present disclosure includes (a) obtaining a calibration parameter of a first camera, (b) using a second camera to obtain a relative position between the first camera and the second camera, and (c) displaying a specific image representing a calibration state of the first camera on a display device with a positional posture changing with a value of the calibration parameter so as to be superimposed on an image taken by the second camera.

8 Claims, 8 Drawing Sheets

(56) References Cited

U.S. PATENT DOCUMENTS

| | | | | |
|---|---|---|---|---|
| 11,468,596 | B2* | 10/2022 | Tsuchiya | G06T 7/30 |
| 11,865,730 | B2* | 1/2024 | Kume | B25J 19/023 |
| 2003/0151720 | A1* | 8/2003 | Chernyak | A61B 3/1015 |
| | | | | 351/206 |
| 2004/0153671 | A1* | 8/2004 | Schuyler | G07C 9/28 |
| | | | | 726/9 |
| 2005/0094879 | A1* | 5/2005 | Harville | G06V 40/103 |
| | | | | 382/209 |
| 2015/0170365 | A1* | 6/2015 | Liu | G06T 7/80 |
| | | | | 382/103 |
| 2016/0214255 | A1* | 7/2016 | Uhlenbrock | B25J 9/1674 |
| 2017/0223279 | A1* | 8/2017 | Mueller | G06F 3/0425 |
| 2017/0270683 | A1* | 9/2017 | Sakamoto | G06T 7/74 |
| 2019/0147623 | A1* | 5/2019 | Tsuchiya | G06T 7/30 |
| | | | | 702/85 |
| 2021/0086366 | A1* | 3/2021 | Ooba | B25J 9/1697 |
| 2021/0097719 | A1* | 4/2021 | Kulbida | G06T 7/33 |
| 2022/0067971 | A1* | 3/2022 | Alexovski | G06T 7/80 |
| 2023/0059657 | A1* | 2/2023 | Hu | H04N 13/246 |
| 2025/0083326 | A1* | 3/2025 | Asano | B25J 9/1697 |

\* cited by examiner

METHOD OF VISUALIZING CALIBRATION STATE OF CAMERA, SYSTEM, AND NON-TRANSITORY COMPUTER-READABLE STORAGE MEDIUM STORING COMPUTER PROGRAM

The present application is based on, and claims priority from JP Application Serial Number 2022-084959, filed May 25, 2022, the disclosure of which is hereby incorporated by reference herein in its entirety.

BACKGROUND

1. Technical Field

The present disclosure relates to a method of visualizing a calibration state of a camera, a system, and a non-transitory computer-readable storage medium storing a computer program.

2. Related Art

In a variety of devices such as a robot, there is used a technology of making a position of an object be recognized using a camera to realize an interaction operation with the object. When using the camera for such a purpose, there are set calibration parameters of the camera by performing a calibration in advance. In the calibration parameters, there are included internal parameters representing a performance of the lens and a relationship between the lens and pixels, and an external parameter representing a relative position between the camera and an external device. When using the camera in a robot, by fixing the relative position with respect to the robot, and at the same time, arranging the camera at a position at which the entire working area falls within the visual field range of the camera, it is possible to calculate external parameters between the camera and the robot. A technology of obtaining such external parameters is disclosed in JP-A-2021-24056.

However, in the calibration parameters of the camera, there occurs a misalignment due to a temporal change in some cases. Therefore, there is a demand that it is desired to confirm whether or not the calibration parameters are correct.

SUMMARY

According to a first aspect of the present disclosure, there is provided a method of visualizing a calibration state of a camera. This method includes (a) obtaining a calibration parameter of a first camera, (b) using a second camera to obtain a relative position between the first camera and the second camera, and (c) displaying a specific image representing a calibration state of the first camera on a display device with a positional posture changing with a value of the calibration parameter so as to be superimposed on an image taken by the second camera.

According to a second aspect of the present disclosure, there is provided a system configured to visualize a calibration state of a camera. The system includes a first camera configured to take an image to be used by a camera-applied device, a second camera to be used for a confirmation of a calibration state of the first camera, a display device configured to display an image taken by the second camera, and a control device to be coupled to the first camera, the second camera, and the display device. The control device is configured to execute (a) obtaining a calibration parameter of the first camera, (b) using the second camera to obtain a relative position between the first camera and the second camera, and (c) displaying a specific image representing the calibration state of the first camera on the display device with a positional posture changing with a value of the calibration parameter so as to be superimposed on an image taken by the second camera.

According to a third aspect of the present disclosure, there is provided a non-transitory computer-readable storage medium storing a computer program configured to make a processor execute processing of visualizing a calibration state of a camera. The computer program is configured to make the processor execute (a) obtaining a calibration parameter of a first camera, (b) using a second camera to obtain a relative position between the first camera and the second camera, and (c) displaying a specific image representing a calibration state of the first camera on a display device with a positional posture changing with a value of the calibration parameter so as to be superimposed on an image taken by the second camera.

DESCRIPTION OF EXEMPLARY EMBODIMENTS

A. First Embodiment

Figure 1:
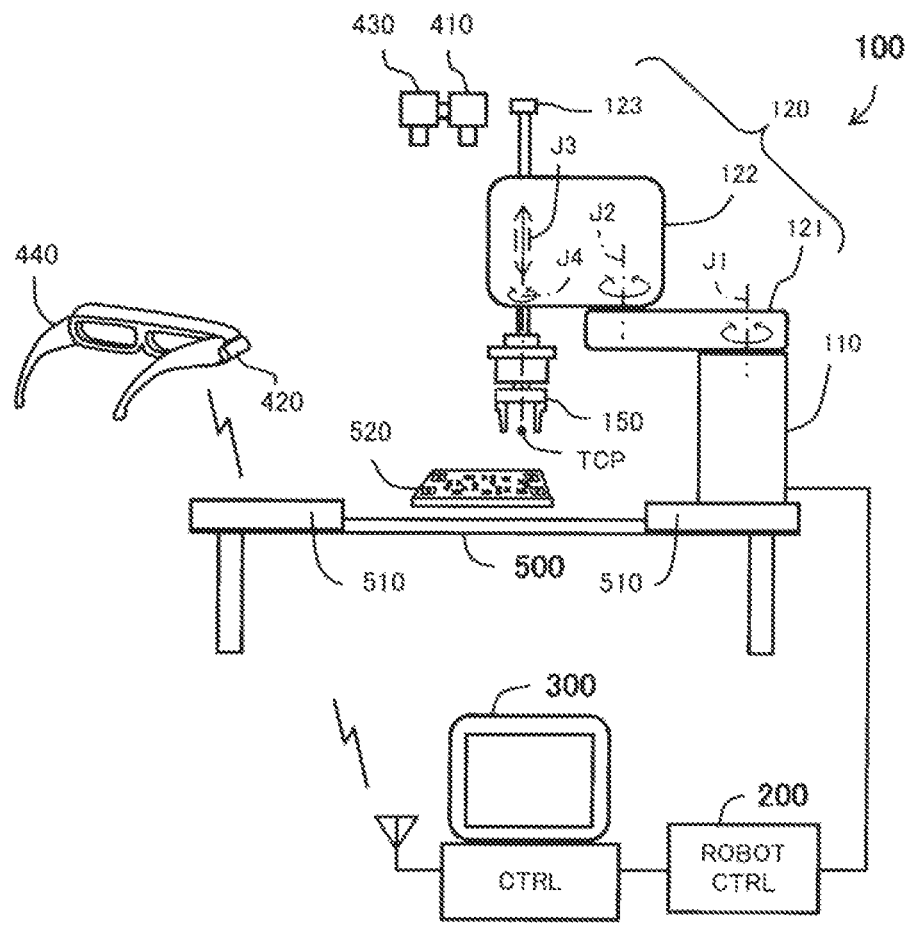
FIG. 1 is an explanatory diagram showing a configuration of a robotic system according to an embodiment.

FIG. 1 is an explanatory diagram showing an example of a robotic system according to an embodiment. This robotic system is provided with a robot 100 as a camera-applied device, a robot controller 200 for controlling the robot 100, a control device 300, three cameras 410, 420, and 430, a pair of VR glasses 440 (Virtual Reality Glasses), and a workbench 500. The control device 300 is, for example, a personal computer. The control device 300 transmits a control command to the robot controller 200. The control device 300 can be called a "higher-level device."

The robot 100 is provided with a platform 110 and a robot arm 120. The robot arm 120 has a first link 121, a second link 122, and an operating shaft 123. At a tip of the robot arm 120, there is mounted a robot hand 150 as an end effector.

The robot hand 150 can be realized as a gripper capable of gripping a work, or an adsorption pad. In the vicinity of the tip portion of the robot hand 150, there is set a TCP (Tool Center Point) as a control point of the robot 100. It should be noted that the control point TCP can be set at an arbitrary position.

The robot arm 120 is sequentially coupled with four joints J1 through J4. Although the four-axis robot is illustrated in the present embodiment, it is possible to use a robot having an arbitrary robot arm mechanism having a plurality of joints. Further, the robot 100 according to the present embodiment is a horizontal articulated robot, but it is possible to use a vertical articulated robot.

The first camera 410 is used for taking an image of the work to be an operation target of the robot 100 to obtain a 3D position and a posture of the work. As the first camera 410, it is preferable to use an RGB camera, but it is possible to use an RGBD camera or a black-and-white camera. The RGBD camera is a camera having the RGB camera and a D camera (a depth camera). In the example shown in FIG. 1, the first camera 410 is fixed at a position above the workbench 500. It should be noted that it is sufficient for the first camera 410 to be installed at a position at which a relative position between the robot coordinate system and the first camera 410 can be determined regardless of the posture of the robot arm 120. For example, it is possible to fix the first camera 410 to the second link 122 of the robot 100. The robot 100 is a camera-applied device which uses an imaging result of the first camera 410. It should be noted that as the camera-applied device, it is possible to use a device of an arbitrary type other than the robot 100.

The second camera 420 is used for taking an image of a working environment including the workbench 500 in order to confirm the calibration state of the first camera 410. As the second camera 420, it is preferable to use an RGB camera, but it is possible to use a black-and-white camera, and further, it is possible to use a stereo camera instead of a monocular camera. When the second camera 420 is the stereo camera, it is sufficient for a marker to be a marker with which positions of specific reference points can respectively be recognized in right and left images, and it is not required for the marker to be a marker with which the 3D position and the posture can be recognized from a single image. In the example shown in FIG. 1, the second camera 420 is fixed to the pair of VR classes 440 worn by the user. It should be noted that it is possible for the second camera 420 to be installed at a fixed position in the working environment.

The third camera 430 is used for obtaining depth information in the image taken by the first camera 410. As the third camera 430, it is possible to use what functions as the stereo camera together with, for example, the first camera 410. Alternatively, as the third camera 430, it is possible to use a depth camera for measuring the depth. In the example shown in FIG. 1, the third camera 430 is fixed at a position above the workbench 500 together with the first camera 410. It should be noted that it is sufficient for the third camera 430 to be installed at a position at which a relative position between the first camera 410 and the third camera 430 can be determined regardless of the posture of the robot arm 120. It is possible to omit the third camera 430.

The pair of VR glasses 440 are a display device for displaying the taken image taken by the second camera 420. The pair of VR glasses 440 further display a specific image representing the calibration state of the first camera 410 as virtual reality. As the display device, it should be noted that it is possible to use the display device of an arbitrary type other than the pair of VR glasses 440.

The robot 100 is mounted on the workbench 500. On the four corners of the workbench 500, there are installed corner frames 510 indicating the working area. Above the workbench 500, there is further drawn a marker board 520. The marker board 520 is what is mounted in a state parallel to a surface of the workbench 500, but is drawn in a tilted posture above the workbench 500 in FIG. 1 for the sake of convenience of illustration.

The marker board 520 is what is used for obtaining a relative position between the first camera 410 and the second camera 420, and is an object shaped like a flat plate having a surface on which a pattern for recognizing the position and the posture thereof is drawn. The surface pattern of the marker board 520 is configured as a marker with which the position and the posture of the marker board 520 can be recognized. Instead of the marker board 520, it is possible to arrange the marker at a position where the relative position to the first camera 410 is fixed. For example, it is possible to fix the marker to a chassis of the first camera 410 or the robot 100. It should be noted that when the first camera 410 and the second camera 420 constitute the stereo camera, it is sufficient for the marker to be a marker with which the positions of specific reference points can respectively be recognized in the right and left images, and it is not required for the marker to be a marker with which the 3D position and the posture can be recognized from a single image.

Figure 2:
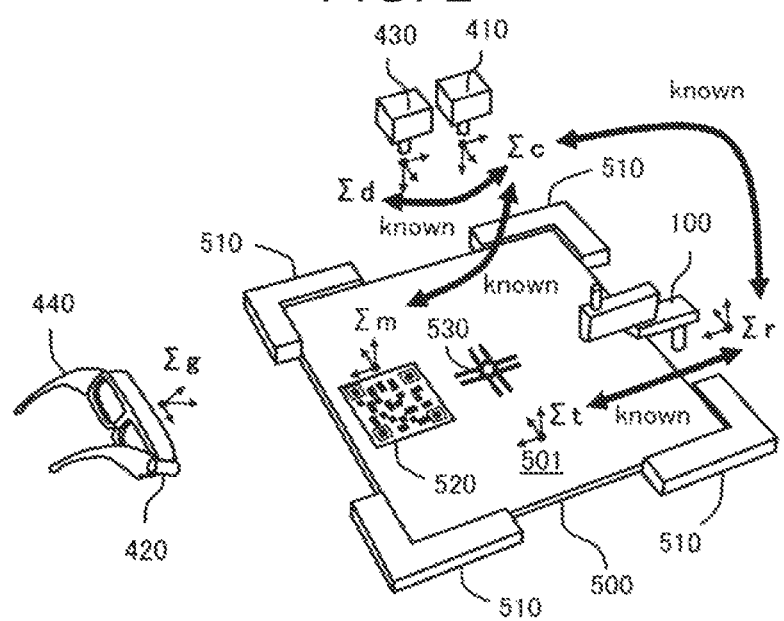
FIG. 2 is a conceptual diagram showing a relationship between a variety of coordinate systems in a first embodiment.

FIG. 2 is a conceptual diagram showing a relationship between a variety of coordinate systems in a first embodiment. In this example, for the sake of convenience of illustration, the original positions of the respective coordinate systems are drawn at positions shifted from actual positions, and further, the robot 100 is drawn so as to be smaller than in reality. The marker board 520 is installed at a predetermined position on an X-Y plane 501 of the workbench 500. On the horizontal X-Y plane 501 of the workbench 500, there is disposed a reference mark 530 representing the reference position where the specific image representing the calibration state is arranged.

The coordinate systems drawn in FIG. 2 are as follows.

(1) Robot Coordinate System $\Sigma r$

The robot coordinate system $\Sigma r$ is a 3D orthogonal coordinate system having a coordinate origin at a position determined in advance in the robot 100.

(2) Table Coordinate System $\Sigma t$

The table coordinate system $\Sigma t$ is a 3D orthogonal coordinate system having a coordinate origin at a position determined in advance on the X-Y plane 501 of the workbench 500.

(3) Marker Coordinate System $\Sigma m$

The marker coordinate system $\Sigma m$ is a 3D orthogonal coordinate system having a coordinate origin at a position determined in advance in the marker board 520.

(4) First Camera Coordinate System $\Sigma c$

The first camera coordinate system $\Sigma c$ is a 3D orthogonal coordinate system having a coordinate origin at a position determined in advance in the first camera 410.

(5) Second Camera Coordinate System $\Sigma g$

The second camera coordinate system $\Sigma g$ is a 3D orthogonal coordinate system having a coordinate origin at a position determined in advance in the second camera 420. Since the pair of VR glasses 440 are the display device for displaying the image taken by the second camera 420, a pixel coordinate of the pair of VR glasses 440 can be obtained by converting the 3D coordinate of the second camera coordinate system Σg with a projective conversion matrix of the second camera 420.

(6) Third Camera Coordinate System Σd

The third camera coordinate system Σd is a 3D orthogonal coordinate system having a coordinate origin at a position determined in advance in the third camera 430.

When a calibration is performed on the first camera 410 with respect to the robot 100, the relative position between the first camera coordinate system Σc and the robot coordinate system Σr becomes known. In other words, the 3D coordinate values in each of the first camera coordinate system Σc and the robot coordinate system Σr can be converted using external parameters included in the calibration parameters of the first camera 410. It is assumed that the relative position between the robot coordinate system Σr and the table coordinate system Σt is also known. It is assumed that the relative position between the first camera coordinate system Σc and the marker coordinate system Σm is known. Further, it is assumed that the relative position between the first camera coordinate system Σc and the third camera coordinate system Σd is also known.

Instead of using the marker board 520, it is possible to fix the pattern as the marker to the first camera 410 or the robot 100. Also in this case, the relative position between the first camera coordinate system Σc and the marker coordinate system Σm becomes known. Further, it is preferable to arrange that the relative position between the first camera coordinate system Σc and the marker coordinate system Σm is calculated using the external parameters of the first camera 410.

Figure 3:
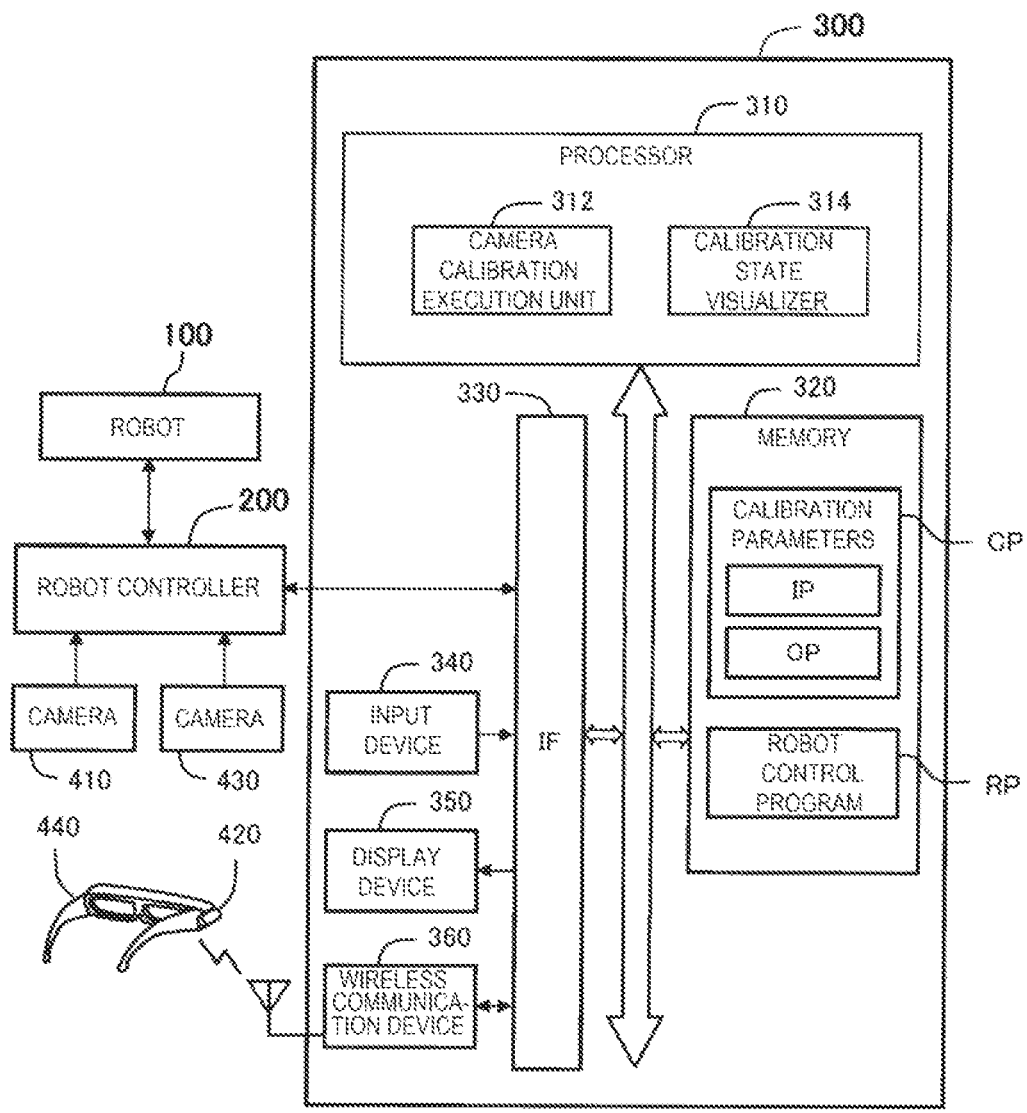
FIG. 3 is a functional block diagram of a control device in the embodiment.

FIG. 3 is a block diagram showing a function of the control device 300. The control device 300 has a processor 310, a memory 320, and an interface circuit 330. To the interface circuit 330, there are coupled an input device 340, a display device 350, and a wireless communication device 360, and further, there are also coupled the robot controller 200, the first camera 410, and the third camera 430. The second camera 420 and the pair of VR glasses 440 are wirelessly coupled to the wireless communication device 360 of the control device 300 via a wireless communication device provided to the pair of VR glasses 440. It should be noted that it is possible to couple the second camera 420 and the pair of VR glasses 440 to the control device 300 with wire.

The processor 310 has functions as a camera calibration execution unit 312 and a calibration state visualizer 314. The camera calibration execution unit 312 executes the calibration of the first camera 410 with respect to the robot 100 to thereby execute processing of determining the calibration parameters of the first camera 410. The calibration state visualizer 314 executes processing of displaying the specific image representing the calibration state of the first camera 410. The functions of the camera calibration execution unit 312 and the calibration state visualizer 314 are each realized by the processor 310 executing a computer program stored in the memory 320. It should be noted that it is possible to realize a part or all of the functions of the camera calibration execution unit 312 and the calibration state visualizer 314 with a hardware circuit.

In the memory 320, there are stored the calibration parameters CP of the first camera 410, and a robot control program RP. The calibration parameters CP include internal parameters IP and external parameters OP. The internal parameters IP are parameters inherent in a lens system of the first camera 410, and include a projective conversion matrix and a strain parameter. The external parameters OP are parameters to be used when calculating the relative position between the first camera 410 and the robot 100, and include a coordinate conversion matrix between the first camera coordinate system Σc and the robot coordinate system Σr. Regarding other cameras, calibration parameters are stored in the memory 320 as needed. The robot control program RP is constituted by a plurality of commands for making the robot 100 operate.

The calibration state visualizer 314 displays the specific image representing the calibration state of the first camera 410 so as to be superimposed on the image taken by the second camera 420 in order to visualize the calibration state of the first camera 410. As the specific image, it is possible to use, for example, a grid-like image representing positions on the X-Y plane 501 of the workbench 500, and a specific marker image. Further, it is possible to use a 3D image as the specific image. The position at which the specific image is displayed is set at the position obtained by converting the 3D coordinate in the first camera coordinate system Σc of the specific position viewed from the first camera 410 into the 3D coordinate in the second camera coordinate system Σg. On this occasion, the 3D coordinate of the specific position is calculated using the calibration parameters of the first camera 410. Therefore, the specific image is displayed with a positional posture changing in accordance with values of the calibration parameters so as to be superimposed on the image taken by the second camera 420. In the present embodiment, as the specific position where the specific image is displayed, there is used the X-Y plane 501 as a horizontal plane of the workbench 500. More specifically, the specific position is set to the reference position indicated by the reference mark 530 shown in FIG. 2. The processing of displaying, in a superimposed manner, the specific image representing the calibration state of the first camera 410 at the position on the X-Y plane 501 of the workbench 500 imaged by the second camera 420 will hereinafter be described.

Figure 4:
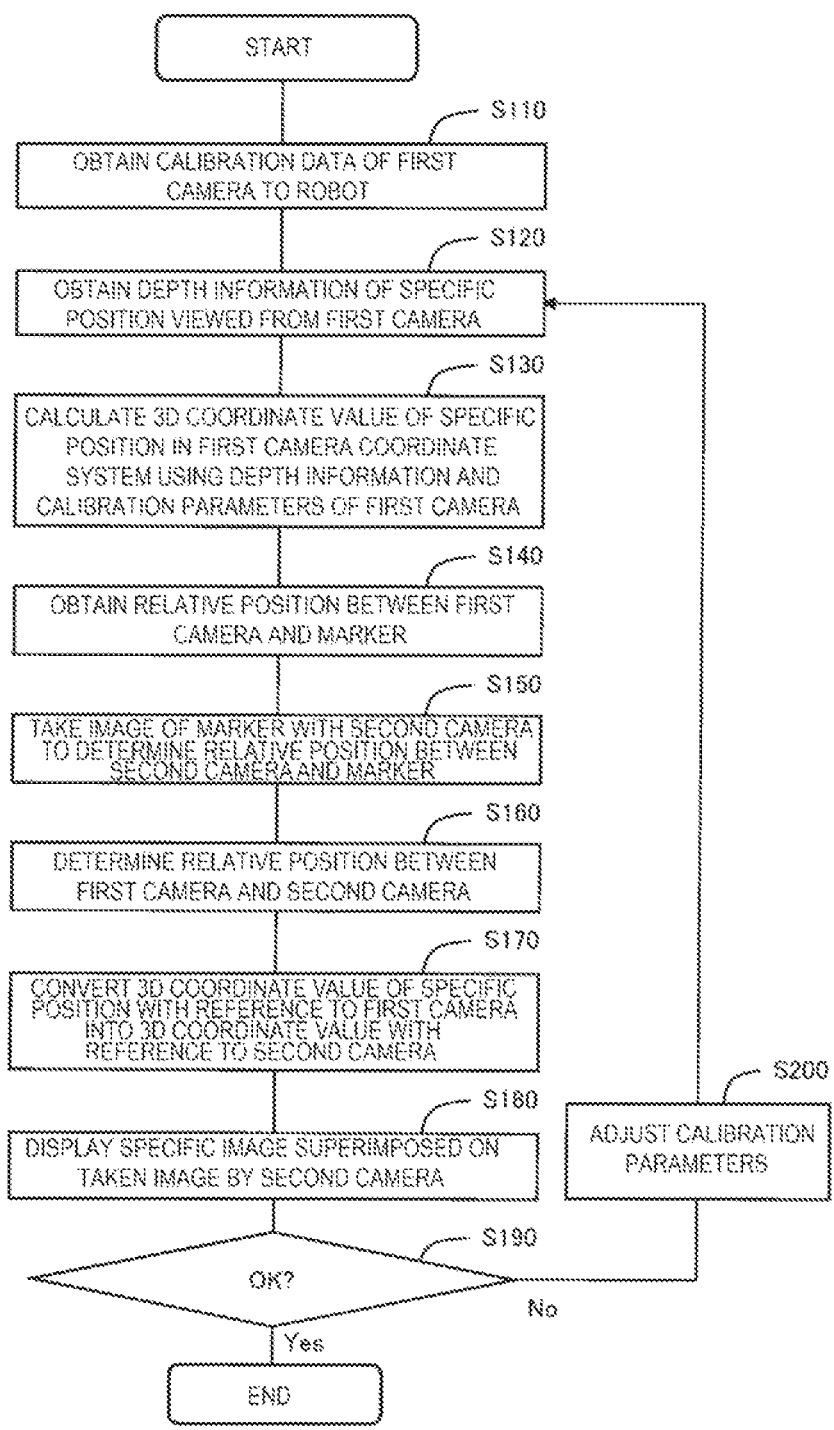
FIG. 4 is a flowchart showing a processing procedure of the first embodiment.

FIG. 4 is a flowchart showing a processing procedure in the first embodiment. In the step S110, the calibration parameters CP of the first camera 410 are obtained. For example, when the calibration processing is executed before the step S110, the calibration state visualizer 314 reads out the calibration parameters CP from the memory 320 to thereby obtain the calibration parameters CP. In contrast, when the calibration processing is not executed, the camera calibration execution unit 312 performs the calibration processing of the first camera 410 to thereby generate the calibration parameters CP. The calibration processing can be executed with a known method using a calibration board. It should be noted that when a calibration pattern substantially the same as the calibration board is drawn on the surface of the marker board 520, it is possible to perform the calibration processing of the first camera 410 using the marker board 520. On this occasion, in order to perform the imaging of the marker board 520 at a plurality of angles, it is possible to grip the marker board 520 with the robot 100, and perform the imaging while changing the angle thereof.

The processing in the step S120 and the subsequent steps is processing of visualizing the calibration parameters obtained in the step S110. When executing the processing in the step S120 and the subsequent steps after a substantial time elapses from the calibration processing, it is possible to confirm whether or not a misalignment occurs in the calibration parameters due to the temporal change using the visualization processing. Further, it is also possible to adjust the calibration parameters as needed.

In the step S120, the calibration state visualizer 314 obtains the depth information at the specific position viewed from the first camera 410. As described above, in the present embodiment, the "specific position" is the horizontal X-Y plane 501 of the workbench 500. As the method of obtaining the depth information, it is possible to use such a variety of methods as illustrated below.

Depth Information Acquisition Method 1

In Acquisition Method 1, the depth at the specific position is measured using the third camera 430, the relative position of which to the first camera 410 is known, as a depth camera. In this method, it is possible to convert the depth measured by the third camera 430 into a depth in the first camera coordinate system Σc using the known coordinate conversion matrix between the first camera coordinate system Σc and the third camera coordinate system Σd.

Depth Information Acquisition Method 2

In Acquisition Method 2, the depth at the specific position is measured with stereo matching using the first camera 410 and the third camera 430 as the stereo camera.

Depth Information Acquisition Method 3

In Acquisition Method 3, a pattern the 3D position of which can be recognized is arranged on the X-Y plane 501 of the workbench 500, the position of the pattern is recognized from the pattern image taken by the first camera 410, and thus, the depth of the X-Y plane of the workbench 500 as the specific position is determined. As such a pattern, it is possible to use, for example, the marker board 520 or the reference mark 530. When using the marker board 520, the depth of the X-Y plane 501 of the workbench 500 becomes a value obtained by adding the thickness of the marker board 520 to the depth of the surface position of the marker board 520. When using this Acquisition Method 3, it is possible to omit the third camera 430.

Depth Information Acquisition Method 4

In Acquisition Method 4, when a distance between the X-Y plane 501 of the workbench 500 as the specific position and the first camera 410 is known, the distance is used as the depth of the X-Y plane 501. When the coordinate conversion matrix between the first camera coordinate system Σc and the table coordinate system Σt is known, it is also possible to obtain the depth information of the X-Y plane 501 from that coordinate conversion matrix. As described with reference to FIG. 2, it is possible to calculate the coordinate conversion matrix between the first camera coordinate system Σc and the table coordinate system Σt using the external parameters of the first camera 410.

Acquisition Method 1 and Acquisition Method 2 described above are the same in the point that the depth information is obtained using the third camera 430. Further, in Acquisition Method 1 and Acquisition Method 2, it is possible to obtain the depth related to an arbitrary shape. Therefore, it is possible to arrange a 3D specific object having a characteristic shape in the visual field of the first camera 410 to use the position of that specific object as the specific position. On this occasion, when displaying the 3D specific image representing the calibration state of the first camera 410 in a superimposed manner at the position of that specific object in the image by the second camera 420 on the display device, there is an advantage that it is easy to confirm the calibration state.

In the step S130, the calibration state visualizer 314 calculates the 3D coordinate values of the specific position in the first camera coordinate system Σc using the depth information obtained in the step S120 and the calibration parameters of the first camera 410. This calculation can be performed in, for example, the following manner.

A matrix K and a strain parameter D included in the internal parameters of the first camera 410 are expressed as the following formulas.

[Math. 1]

$$K = \begin{pmatrix} f_x & 0 & c_x \\ 0 & f_y & c_y \\ 0 & 0 & 1 \end{pmatrix} \quad (1)$$

$$D = (k_1 k_2 p_1 p_2 k_3 k_4 k_5 k_6). \quad (2)$$

Here, $f_x$, $f_y$ each represent a focal distance, $c_x$, $c_y$ each represent a principal point position, $k_1$ through $k_6$ each represent a strain coefficient in a radial direction, and $p_1$, $p_2$ each represent a strain coefficient in a circumferential direction. The matrix K represents the projective conversion between the 3D camera coordinate and the 2D pixel coordinate.

When using the formula (1) and the formula (2) described above and the pixel coordinate (u,v) of the first camera 410, it is possible to calculate a distorted camera homogenous coordinate $(x_d, y_d)$ with the following formula.

[Math.2]

$$\begin{bmatrix} x_d \\ y_d \end{bmatrix} = \begin{bmatrix} (u - c_x)/f_x \\ (v - c_y)/f_y \end{bmatrix}. \quad (3)$$

Further, by solving the following formulas, it is possible to obtain a distortion-removed camera homogenous coordinate $(x_c, y_c)$.

[Math.3]

$$\begin{bmatrix} x_d \\ y_d \end{bmatrix} = \frac{1 + k_1 \bar{r}^2 + k_2 \bar{r}^4 + k_3 \bar{r}^6}{1 + k_4 \bar{r}^2 + k_5 \bar{r}^4 + k_6 \bar{r}^6} \begin{bmatrix} x_c \\ y_c \end{bmatrix} + \begin{bmatrix} 2p_1 x_c y_c + p_2(\bar{r}^2 + 2x_c^2) \\ 2p_2 x_c y_c + p_1(\bar{r}^2 + 2y_c^2) \end{bmatrix} \quad (4)$$

$$\bar{r} = \sqrt{x_c^2 + y_c^2}. \quad (5)$$

The 3D coordinate values $(X_c, Y_c, Z_c)$ of the specific position in the first camera coordinate system Σc are calculated with the following formula using the distortion-removed camera homogenous coordinate $(x_c, y_c)$ and the Z coordinate value $Z_c$ representing the depth at the specific position obtained in the step S120.

[Math.4]

$$\begin{bmatrix} X_c \\ Y_c \\ Z_c \end{bmatrix} = Z_c \begin{bmatrix} x_c \\ y_c \\ 1 \end{bmatrix}. \quad (6)$$

This 3D coordinate values $(X_c, Y_c, Z_c)$ of the specific position are calculated using the calibration parameters of the first camera 410, and are used as the position where the specific image representing the calibration state of the first camera 410 is displayed.

It should be noted that the 3D coordinate values $(X_c, Y_c, Z_c)$ obtained from the formulas (1) through (6) described above can be calculated with respect to an arbitrary position located in the imaging range by the first camera 410 besides the X-Y plane 501 of the workbench 500. Therefore, it is possible to calculate the 3D coordinate values with respect to any other specific positions such as a position of the surface of the marker board 520 or a position of a 3D object using the formulas (1) through (6) described above.

In the step S140, the calibration state visualizer 314 obtains a relative position between the first camera 410 and the marker board 520. As described with reference to FIG. 2, in the first embodiment, the relative position between the first camera coordinate system Σc and the marker coordinate system Σm is known. In other words, a coordinate conversion matrix [R|t]cm between the first camera coordinate system Σc and the marker coordinate system Σm is known. It should be noted that it is possible to arrange that the coordinate conversion matrix [R|t]cm is obtained by multiplying known coordinate conversion matrixes [R|t]cr, [R|t]rt, and [R|t]tm. [R|t]cr represents the coordinate conversion between the first camera coordinate system Σc and the robot coordinate system Σr, [R|t]rt represents the coordinate conversion between the robot coordinate system Σr and the table coordinate system Σt, and [R|t]tm represents the coordinate conversion between the table coordinate system Σt and the marker coordinate system Σm. The coordinate conversion matrix [R|t]cr between the first camera coordinate system Σc and the robot coordinate system Σr is an external parameter included in the calibration parameter of the first camera 410.

In the step S150, the calibration state visualizer 314 takes an image of the marker board 520 with the second camera 420 to determine a relative position between the second camera 420 and the marker board 520. In the step S160, the calibration state visualizer 314 determines a relative position between the first camera 410 and the second camera 420 using the results in the step S140 and the step S150.

Figure 5:
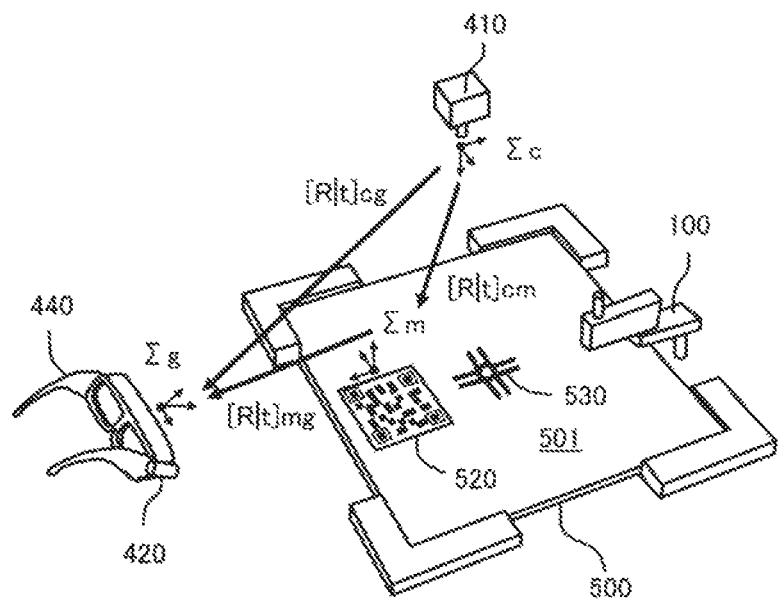
FIG. 5 is an explanatory diagram showing a method of determining a relative position between a first camera and a second camera.

FIG. 5 is an explanatory diagram showing a method of determining the relative position between the first camera 410 and the second camera 420 in the steps S140 through S160. The marker board 520 has a marker pattern with which the 3D position in the marker coordinate system Σm can be recognized. Therefore, by taking an image of the marker board 520 with the second camera 420 to obtain the marker image, and analyzing the marker image, it is possible to determine the coordinate conversion matrix [R|t]mg between the marker coordinate system Σm and the second camera coordinate system Σg. Further, by multiplying the coordinate conversion matrixes [R|t]cm, [R|t]mg, it is possible to obtain the coordinate conversion matrix [R|t]cg between the first camera coordinate system Σc and the second camera coordinate system Σg. As described above, in the first embodiment, the image of the marker board 520 is taken by the second camera 420, and the relative position between the first camera 410 and the second camera 420 is determined using the result obtained by analyzing that image.

In the step S170 in FIG. 4, the calibration state visualizer 314 converts the 3D coordinate values at the specific position based on the first camera into the 3D coordinate values based on the second camera. This conversion is processing of converting the 3D coordinate values $(X_c, Y_c, Z_c)$ at the specific position obtained in the step S130 described above into the 3D coordinate values in the second camera coordinate system Σg using the coordinate conversion matrix [R|t]cg obtained in the step S160.

In the step S180, the calibration state visualizer 314 superimposes the specific image representing the calibration state of the first camera 410 on the taken image by the second camera 420, and then displays the result on the pair of VR glasses 440 as the display device.

Figure 6:
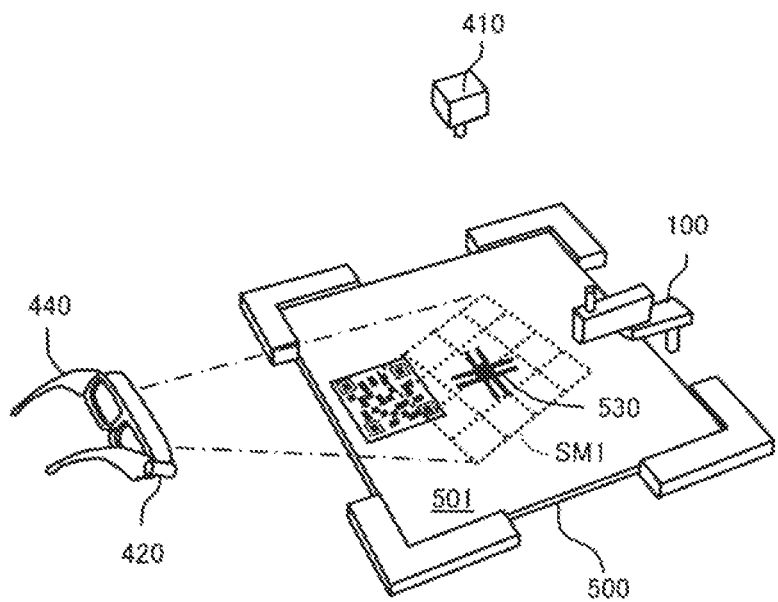
FIG. 6 is an explanatory diagram showing a display example of a specific image representing a calibration state.

FIG. 6 is an explanatory diagram showing an example in which the specific image representing the calibration state is displayed in the step S180. In this example, the specific image SM1 is a grid-like image indicating 3D positions on the X-Y plane 501 of the workbench 500. The pixel coordinate values at the display positions of the specific image SM1 can be obtained by converting the 3D coordinate values in the second camera coordinate system Σg obtained in the step S170 into the 2D pixel coordinate values with the projective conversion matrix of the second camera 420. In the processing in the steps S120 through S170, since the calibration parameters of the first camera 410 are used, the specific image SM1 is superimposed on the image taken by the second camera 420, and is displayed with the positional posture changing with the values of the calibration parameters. It is possible for the user to confirm whether or not the calibration state of the first camera 410 is correct by comparing the display position of the specific image SM1 with the display position of the X-Y plane 501 of the workbench 500. In particular, in the present embodiment, since the reference mark 530 representing the reference position of the specific image SM1 is disposed on the X-Y plane 501, it is possible to easily confirm the calibration state of the first camera 410 by comparing the specific image SM1 and the reference mark 530 with each other. Further, in the present embodiment, since the display of the specific image SM1 is performed using the pair of VR glasses 440 equipped with the second camera 420, when the user changes the position of the second camera 420, the display positions of the X-Y plane 501 of the workbench 500 and the specific image SM1 are changed accordingly. Therefore, there is an advantage that it is easy to confirm whether or not the position of the specific image SM1 coincides with the X-Y plane 501 of the workbench 500.

Figure 7:
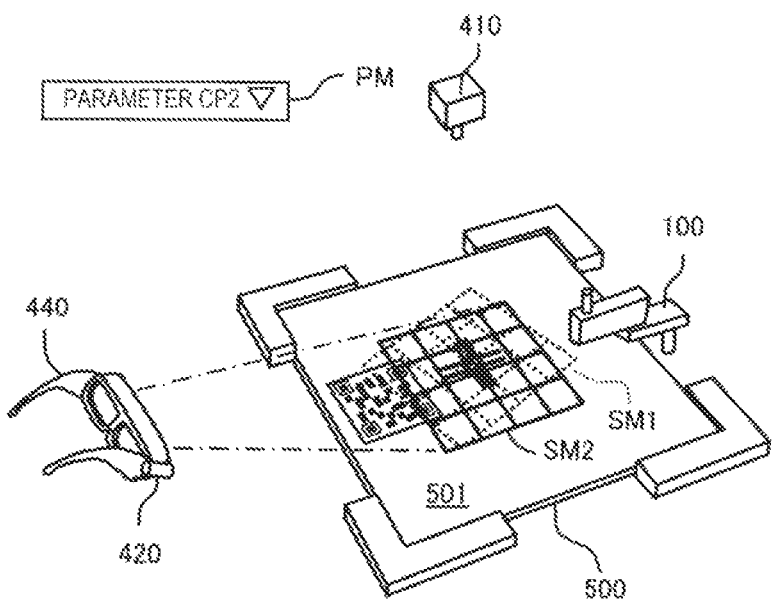
FIG. 7 is an explanatory diagram showing another display example of the specific image representing a calibration state.

FIG. 7 is an explanatory diagram showing another display example of the specific image representing the calibration state. Here, there is shown an example in which it is possible to display a plurality of specific images SM1, SM2 in accordance with the plurality of sets of the calibration parameters different from each other. As the calibration parameters of the first camera 410, there is formed a plurality of sets of parameters in some cases in accordance with a difference in pixel area or a difference in depth of the first camera 410. In such a case, it is preferable to display a plurality of specific images corresponding to the plurality of sets of parameters.

In the example shown in FIG. 7, on a display screen of the pair of VR glasses 440 as the display device, there is displayed a pull-down menu PM for selecting one of the sets of the calibration parameters. When the user selects one of the sets of parameters using the pull-down menu PM, the specific image corresponding to that set of parameters is selectively displayed. It should be noted that it is also possible to display the plurality of specific images SM1, SM2 corresponding respectively to the plurality of sets of parameters at the same time. As described above, by displaying the plurality of specific images SM1, SM2 corresponding respectively to the plurality of sets of parameters selectively or at the same time, there is an advantage that it is possible for the user to confirm which one of the plurality of sets of parameters is high in accuracy.

In the step S190 in FIG. 4, the user looks at the image displayed in the step S180 to determine whether or not the calibration state of the first camera 410 is good. When the calibration state is not good, the process proceeds to the step S200, and an adjustment of the calibration parameters is executed.

Figure 8:
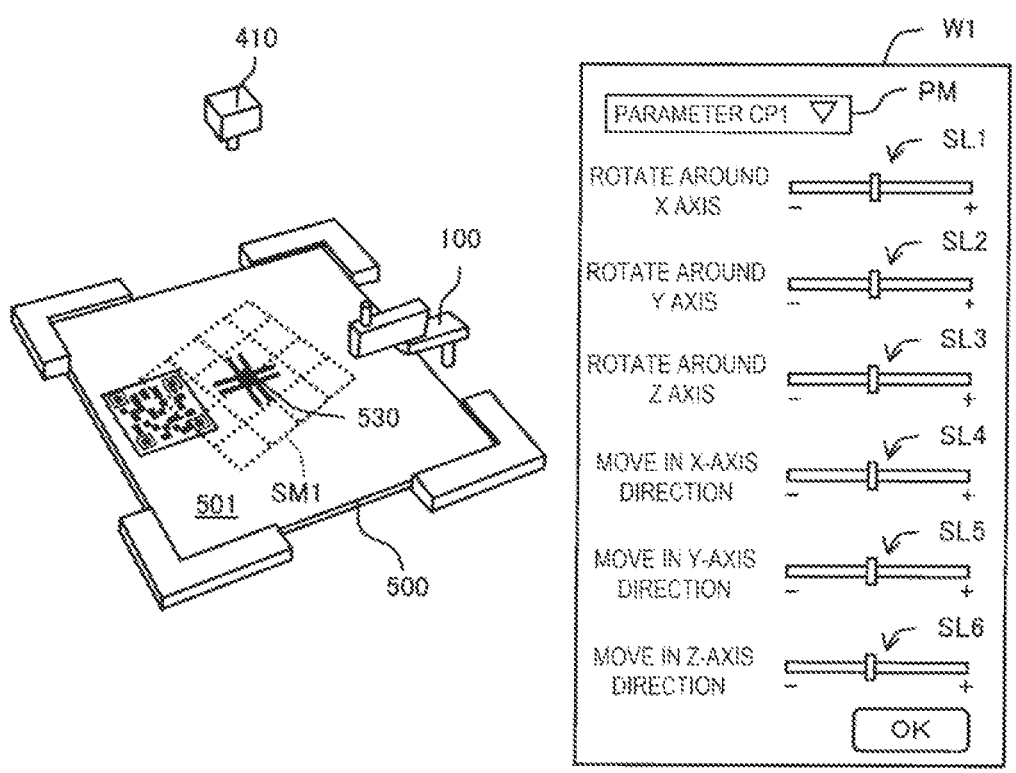
FIG. 8 is an explanatory diagram showing an example of an adjustment window for calibration parameters.

FIG. 8 is an explanatory diagram showing an example of an adjustment window W1 for the calibration parameters to be displayed on the display device in the step S200. In this adjustment window W1, there are disposed a pull-down menu PM for selecting one of the sets of the calibration parameters, and sliders SL1 through SL6 for adjusting the position and the posture of the specific image SM1. It is possible for the user to adjust the position and the posture of the specific image SM1 using these sliders SL1 through SL6. Further, it is also possible to use other adjustment tools than the sliders SL1 through SL6. The calibration state visualizer 314 adjusts the calibration parameters of the first camera 410 in accordance with adjustment amounts for the specific image SM1 by the user. The external parameters are mainly become the adjustment target. It should be noted that it is possible to include the internal parameters in the adjustment target. It should be noted that the pull-down menu PM can be eliminated.

As the adjustment tools, it is possible to use those directly adjusting the values of the calibration parameters of the first camera 410. In other words, it is possible to arrange that at least one of the adjustment tools for adjusting the positional posture of the specific image SM1 and the adjustment tools for adjusting the values of the calibration parameters are displayed on the display device together with the specific image SM1. By adjusting the values of the calibration parameters in accordance with the adjustment by the user, it is possible to adjust the calibration parameters into appropriate values when the calibration state represented by the specific image SM1 is not appropriate.

After performing the adjustment of the calibration parameters in the step S200, the process returns to the step S120, and the processing in the steps S120 through S190 described above is repeated. It should be noted that when the adjustment of the calibration parameters does not affect the depth information, the processing in the step S120 is skipped. When it is determined in the step S190 that the calibration state is good, the processing shown in FIG. 4 is terminated.

As described hereinabove, in the first embodiment described above, since the specific image SM1 representing the calibration state of the first camera 410 is superimposed on the image taken by the second camera 420, and is then displayed with the positional posture changing in accordance with the values of the calibration parameters, it is possible to visually confirm the calibration state of the first camera 410.

It should be noted that it is possible to display an image representing a 3D object instead of the planar image as the specific image SM1 representing the calibration state. For example, it is possible to display a 3D image representing the marker board 520 as the specific image. This way, by the user observing the relationship between this specific image and the actual position of the marker board 520, it is possible to confirm whether or not the calibration state of the first camera 410 is correct. Further, the position where the specific image representing the calibration state is displayed is not limited to the X-Y plane 501 of the workbench 500, and can also be set at an arbitrary position within the imaging range by the first camera 410.

B. Second Embodiment

Figure 9:
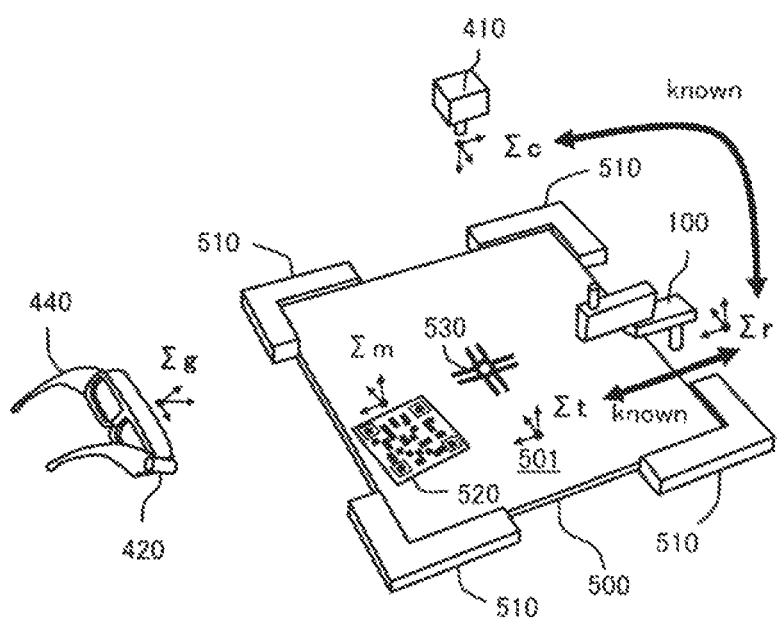
FIG. 9 is a conceptual diagram showing a relationship between a variety of coordinate systems in a second embodiment.

FIG. 9 is a conceptual diagram showing a relationship between a variety of coordinate systems in a second embodiment. It should be noted that the configuration of the device is the same as the configuration in the first embodiment shown in FIG. 1 and FIG. 3. In the second embodiment, the marker board 520 is arranged at an arbitrary position where the marker board 520 can be imaged by the first camera 410 and the second camera 420.

Similarly to the first embodiment, also in the second embodiment, the relative position between the first camera coordinate system $\Sigma c$ and the robot coordinate system $\Sigma r$ is known, and the coordinate conversion matrix [R|t]cr thereof is included in the external parameter of the first camera 410. Further, the coordinate conversion matrix [R|t]rt between the robot coordinate system $\Sigma r$ and the table coordinate system $\Sigma t$ is also known. It contrast, the relative position between the first camera coordinate system $\Sigma c$ and the marker coordinate system $\Sigma m$ is unknown.

Figure 10:
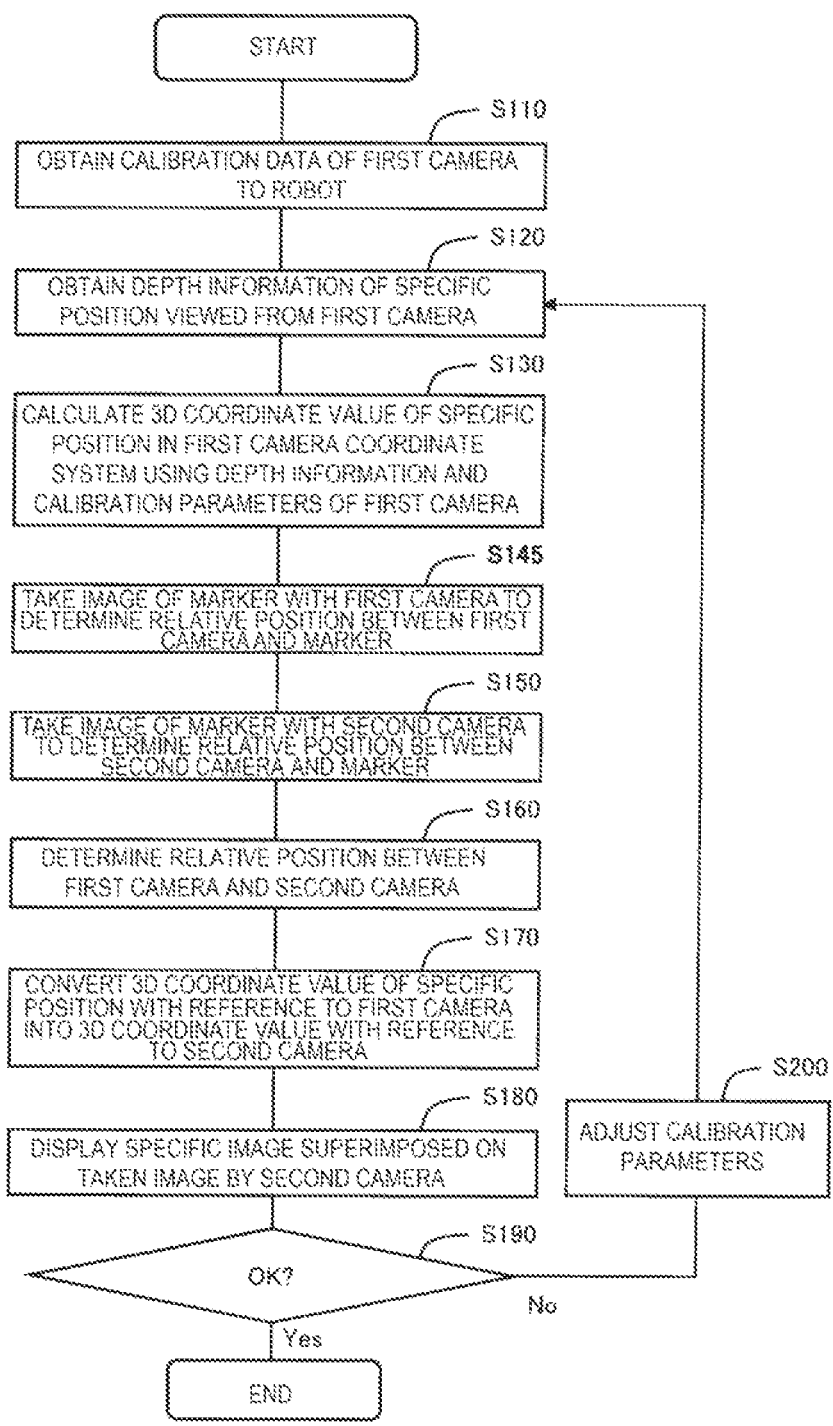
FIG. 10 is a flowchart showing a processing procedure of the second embodiment.

FIG. 10 is a flowchart showing a processing procedure in the second embodiment. The difference from processing procedure in the first embodiment shown in FIG. 4 is only the point that the step S140 is replaced with the step S145, and other steps are substantially the same as those shown in FIG. 4.

In the step S145, the calibration state visualizer 314 takes an image of the marker board 520 with the first camera 410 to obtain the marker image, and analyzes the marker image to thereby determine the coordinate conversion matrix [R|t]cm between the first camera coordinate system $\Sigma c$ and the marker coordinate system $\Sigma m$. In the step S150, similarly to the first embodiment, by taking an image of the marker board 520 with the second camera 420 to obtain the marker image, and analyzing the marker image, the coordinate conversion matrix [R|t]mg between the marker coordinate system $\Sigma m$ and the second camera coordinate system $\Sigma g$ is determined. In the step S160, the relative position between the first camera 410 and the second camera 420 is determined using the results in the step S140 and the step S150. Specifically, by multiplying the coordinate conversion matrixes [R|t]cm, [R|t]mg, the coordinate conversion matrix [R|t]cg between the first camera coordinate system $\Sigma c$ and the second camera coordinate system $\Sigma g$ is determined.

The processing in the steps S145, S150, and S160 in the second embodiment is the same as the processing in the steps S140, S150, and S160 in the first embodiment in the point that the coordinate conversion matrix [R|t]cg representing the relative position between the first camera 410 and the second camera 420 is determined using the marker image. The processing in the step S170 and the subsequent steps is the same as in the first embodiment, and therefore, the description thereof will be omitted.

It should be noted that in the step S120 in the second embodiment, as described as the Depth Information Acquisition Method 4 in the first embodiment, it is preferable to obtain the depth information of the X-Y plane 501 from the known coordinate conversion matrix [R|t]ct between the first camera coordinate system $\Sigma c$ and the table coordinate system $\Sigma t$. The coordinate conversion matrix [R|t]ct can be obtained by multiplying the known coordinate conversion matrix [R|t]cr between the first camera coordinate system $\Sigma c$ and the robot coordinate system $\Sigma r$, and the known coordinate conversion matrix [R|t]rt between the robot coordinate system $\Sigma r$ and the table coordinate system $\Sigma t$. The coordinate conversion matrix [R|t]cr between the first camera coordinate system $\Sigma c$ and the robot coordinate system $\Sigma r$ corresponds to an external parameter of the first camera 410. Therefore, the 3D coordinate values of the specific position based on the second camera calculated in the steps S120 through S170 in the second embodiment become values calculated using the external parameter of the first camera 410.

As is understood from the above description, in the second embodiment, the relative position between the first camera 410 and the marker board 520 is determined by performing the processing of analyzing the marker image taken by the first camera 410 to determine the relative position between the first camera 410 and the marker board 520 instead of using the known relative position between the first camera 410 and the marker. In either of the cases of the first embodiment and the second embodiment, an arbitrary pattern with which the relative position to the first camera 410 can be determined can be used as the marker. The words "the relative position to the first camera 410 can be determined" include both cases, namely when the relative position to the first camera 410 is known as in the first embodiment, and when the relative position to the first camera 410 can be determined by analyzing the image obtained by imaging the marker with the first camera 410 as in the second embodiment.

As described hereinabove, also in the second embodiment, similarly to the first embodiment, since the specific image SM1 representing the calibration state of the first camera 410 is superimposed on the image taken by the second camera 420, and is then displayed with the positional posture changing in accordance with the values of the calibration parameters, it is possible to visually confirm the calibration state of the first camera 410.

Other Aspects:

The present disclosure is not limited to the embodiments described above, but can be implemented in a variety of aspects within the scope or the spirit of the present disclosure. For example, the present disclosure can also be implemented in the following aspects. The technical features in the embodiments described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided a method of visualizing a calibration state of a camera. This method includes (a) obtaining a calibration parameter of a first camera, (b) using a second camera to obtain a relative position between the first camera and the second camera, and (c) displaying a specific image representing a calibration state of the first camera on a display device with a positional posture changing with a value of the calibration parameter so as to be superimposed on an image taken by the second camera.

According to this method, since the specific image representing the calibration state of the first camera is superimposed on the image taken by the second camera, and is then displayed with the positional posture changing in accordance with the value of the calibration parameter, it is possible to visually confirm the calibration state of the first camera.

(2) In the method described above, the step (b) may include (b1) determining first 3D coordinate values in a reference coordinate system of the first camera with respect to a specific position located within an imaging range of the first camera, (b2) imaging, by the second camera, a marker with which a relative position to the first camera is determined, to thereby obtain a marker image, and (b3) determining a coordinate conversion matrix representing the relative position between the first camera and the second camera, using the marker image. Further, the step (c) may include (c1) converting the first 3D coordinate values in the reference coordinate system of the first camera into second 3D coordinate values in a reference coordinate system of the second camera, using the coordinate conversion matrix, and (c2) setting a position represented by the second 3D coordinate values on a position of the specific image in an image taken by the second camera.

According to this method, it is possible to determine the relative position between the first camera and the second camera using the marker to thereby determine the position where the target image is displayed.

(3) In the method described above, the step (b1) includes obtaining depth information at the specific position in an image taken by the first camera, using a third camera, and calculating the first 3D coordinate values at the specific position using a pixel coordinate value of the first camera related to the specific position, the depth information, and an internal parameter included in the calibration parameter.

According to this method, it is possible to obtain the 3D coordinate values at the specific position in the reference coordinate system of the first camera, using the depth information obtained by the third camera.

(4) In the method described above, the step (b1) may include obtaining depth information at the specific position in an image taken by the first camera, using a pattern with which a 3D position is recognized, and calculating the first 3D coordinate values at the specific position using a pixel coordinate value of the first camera related to the specific position, the depth information, and an internal parameter included in the calibration parameter.

According to this method, it is possible to obtain the 3D coordinate values at the specific position in the reference coordinate system of the first camera, using the depth information obtained from the pattern with which the 3D position is recognized.

(5) In the method described above, the specific position may be a horizontal X-Y plane, and the specific image may be an image representing the X-Y plane.

According to this method, by observing a relationship between the X-Y plane to be displayed on the display device and the specific image, it is possible to visually confirm the calibration state of the first camera.

(6) In the method described above, the calibration parameter may include a plurality of sets of the calibration parameters, and the step (c) may include displaying a plurality of the specific images corresponding respectively to the plurality of sets of the calibration parameters on the display device.

According to this method, it is possible to visually confirm the plurality of specific images corresponding respectively to the plurality of sets of the calibration parameters.

(7) In the method described above, there may further be included (d) displaying an adjustment tool configured to adjust at least one of a positional posture of the specific image and a value of the calibration parameter on the display device together with the specific image, and (e) adjusting the value of the calibration parameter in accordance with the adjustment by a user using the adjustment tool.

According to this method, when the calibration state represented by the specific image is not appropriate, it is possible to adjust the calibration parameter into an appropriate value.

(8) According to a second aspect of the present disclosure, there is provided a system configured to visualize a calibration state of a camera.

The system includes a first camera configured to take an image to be used by a camera-applied device, a second camera to be used for a confirmation of a calibration state of the first camera, a display device configured to display an image taken by the second camera, and a control device to be coupled to the first camera, the second camera, and the display device. The control device is configured to execute (a) obtaining a calibration parameter of the first camera, (b) using the second camera to obtain a relative position between the first camera and the second camera, and (c) displaying a specific image representing the calibration state of the first camera on the display device with a positional posture changing with a value of the calibration parameter so as to be superimposed on an image taken by the second camera.

(9) According to a third aspect of the present disclosure, there is provided a non-transitory computer-readable storage medium storing a computer program configured to make a processor execute processing of visualizing a calibration state of a camera. The computer program is configured to make the processor execute (a) obtaining a calibration parameter of a first camera, (b) using a second camera to obtain a relative position between the first camera and the second camera, and (c) displaying a specific image representing a calibration state of the first camera on a display device with a positional posture changing with a value of the calibration parameter so as to be superimposed on an image taken by the second camera.

The present disclosure can be implemented in a variety of aspects other than the above. For example, it is possible to implement the present disclosure in an aspect such as a robotic system provided with a robot and a robot control device, a computer program for realizing the function of the robot control device, or a non-transitory storage medium recording the computer program.

What is claimed is:

1. A method of visualizing a calibration state of a first camera, the method comprising:
    (a) obtaining a calibration parameter of the first camera;
    (b) using a second camera to obtain a relative position between the first camera and the second camera, the second camera being attached to VR glasses configured to be worn by a user, the step (b) further including:
        (b1) determining first 3D coordinate values in a reference coordinate system of the first camera with respect to a specific position located within an imaging range of the first camera, the step (b1) further including:
            obtaining depth information at the specific position in an image taken by the first camera, using a third camera; and
            calculating the first 3D coordinate values at the specific position using a pixel coordinate value of the first camera related to the specific position, the depth information, and an internal parameter included in the calibration parameter;
        (b2) imaging, by the second camera, a marker with which the relative position to the first camera is determined, to thereby obtain a marker image; and
        (b3) determining a coordinate conversion matrix representing the relative position between the first camera and the second camera, using the marker image; and
    (c) displaying a specific image representing a calibration state of the first camera on a display device with a positional posture changing with a value of the calibration parameter so as to be superimposed on an image taken by the second camera.

2. The method according to claim 1, wherein the step (c) includes
    (c1) converting the first 3D coordinate values in the reference coordinate system of the first camera into second 3D coordinate values in a reference coordinate system of the second camera, using the coordinate conversion matrix, and
    (c2) setting a position represented by the second 3D coordinate values on a position of the specific image in an image taken by the second camera.

3. The method according to claim 1, wherein the step (b1) includes;
    obtaining the depth information at the specific position in the image taken by the first camera, using a pattern with which a 3D position is recognized.

4. The method according to claim 1, wherein the specific position is a horizontal X-Y plane, and the specific image is an image representing the X-Y plane.

5. The method according to claim 1, wherein the calibration parameter includes a plurality of sets of the calibration parameters, and
    the step (c) includes displaying a plurality of the specific images corresponding respectively to the plurality of sets of the calibration parameters on the display device.

6. The method according to claim 1, further comprising:
    (d) displaying an adjustment tool configured to adjust at least one of a positional posture of the specific image and a value of the calibration parameter on the display device together with the specific image; and
    (e) adjusting the value of the calibration parameter in accordance with the adjustment by the user using the adjustment tool.

7. A system configured to visualize a calibration state of a first camera, the system comprising:
    the first camera configured to take an image to be used by a camera-applied device;
    a second camera to be used for a confirmation of the calibration state of the first camera, the second camera being attached to VR glasses configured to be worn by a user;
    a display device configured to display an image taken by the second camera; and
    a control device to be coupled to the first camera, the second camera, and the display device, wherein
    the control device is configured to execute:
        (a) obtaining a calibration parameter of the first camera;
        (b) using the second camera to obtain a relative position between the first camera and the second camera, the
            (b) further including;
            (b1) determining first 3D coordinate values in a reference coordinate system of the first camera with respect to a specific position located within an imaging range of the first camera, the (b1) further including:
                obtaining depth information at the specific position in an image taken by the first camera, using a third camera; and
                calculating the first 3D coordinate values at the specific position using a pixel coordinate value of the first camera related to the specific position, the depth information, and an internal parameter included in the calibration parameter;
            (b2) imaging, by the second camera, a marker with which the relative position to the first camera is determined, to hereby obtain a marker image; and (b3) determining a coordinate conversion matrix representing the relative position between the first camera and the second camera, using the marker image; and (c) displaying a specific image representing the calibration state of the first camera on the display device with a positional posture changing with a value of the calibration parameter so as to be superimposed on an image taken by the second camera.

8. A non-transitory computer-readable storage medium storing a computer program of making a processor execute processing of visualizing a calibration state of a first camera, the processing comprising:

(a) obtaining a calibration parameter of the first camera;

(b) using a second camera to obtain a relative position between the first camera and the second camera, the second camera being attached to VR glasses configured to be worn by a user, the step (b) further including:

(b1) determining first 3D coordinate values in a reference coordinate system of the first camera with respect to a specific position located within an imaging range of the first camera, the step (b1) further including:

obtaining depth information at the specific position in an image taken by the first camera, using a third camera; and calculating the first 3D coordinate values at the specific position using a pixel coordinate value of the first camera related to the specific position, the depth information, and an internal parameter included in the calibration parameter;

(b2) imaging, by the second camera, a marker with which the relative position to the first camera is determined, to thereby obtain a marker image; and (b3) determining a coordinate conversion matrix representing the relative position between the first camera and the second camera, using the marker image; and (c) displaying a specific image representing a calibration state of the first camera on a display device with a positional posture changing with a value of the calibration parameter so as to be superimposed on an image taken by the second camera.

* * * * *